United States Patent
Lange et al.

(10) Patent No.: US 11,966,646 B1
(45) Date of Patent: Apr. 23, 2024

(54) METHOD OF SELECTING AND DISPLAYING A PRINT JOB ON A USER INTERFACE

(71) Applicant: Canon Production Printing Holding B.V., Venlo (NL)

(72) Inventors: Martinus G. M. Lange, Venlo (NL); Eduardus J. W. Van Vliembergen, Venlo (NL); Andrea E. J. Meessen, Venlo (NL); Arjan Kroes, Venlo (NL); Bastiaan J. Hermus, Venlo (NL); Tim F. P. Paffen, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 0 days.

(21) Appl. No.: 18/386,874

(22) Filed: Nov. 3, 2023

(30) Foreign Application Priority Data

Nov. 17, 2022 (EP) .................................... 22207954

(51) Int. Cl.
G06F 3/12 (2006.01)
H04N 1/00 (2006.01)

(52) U.S. Cl.
CPC .......... G06F 3/1256 (2013.01); G06F 3/1208 (2013.01); G06F 3/125 (2013.01)

(58) Field of Classification Search
CPC ....... G06F 3/1256; G06F 3/1208; G06F 3/125
See application file for complete search history.

(56) References Cited

U.S. PATENT DOCUMENTS

2008/0239381 A1* 10/2008 Oshima ................. G06F 3/1262
  358/1.15
2009/0284765 A1* 11/2009 Iezaki ..................... B41J 29/393
  358/1.9

(Continued)

FOREIGN PATENT DOCUMENTS

EP  1 975 774 A2  10/2008

OTHER PUBLICATIONS

European Search Report of application No. 22 20 7954 dated Apr. 20, 2023.

*Primary Examiner* — Iriana Cruz
(74) *Attorney, Agent, or Firm* — Birch, Stewart, Kolasch & Birch, LLP

(57) ABSTRACT

In a method for selecting a print job and displaying the print job on a second window, the print job includes a digital image to be printed on an image receiving medium by a digital printer having a user interface including a first window representing a waiting room for the print job which is selectable to be printed, and the second window for displaying a virtual representation of the image receiving medium. The method includes displaying a corner indication on the second window, the corner indication indicating a location where a top left corner of the digital image of the print job will be placed on the image receiving medium, and selecting the print job in the first window. Upon selection of the print job in the first window, the corner indication is replaced by a canvas item with a size of a layout of the digital image of the selected print job, and the corner indication is moved to a location on the virtual representation where a next to be selected print job will originate. Upon moving or copying the selected print job from the first window to the second window, the canvas item is replaced (Continued)

by a preview image of the digital image of the selected print job of the same size as the layout.

7 Claims, 8 Drawing Sheets

(56) References Cited

U.S. PATENT DOCUMENTS

2015/0365547 A1* 12/2015 Yoshida .................. H04N 1/00
    358/1.15
2020/0159871 A1* 5/2020 Bowen .................... G06T 11/60

* cited by examiner

METHOD OF SELECTING AND DISPLAYING A PRINT JOB ON A USER INTERFACE

FIELD OF THE INVENTION

The invention relates to a method for selecting a print job and displaying the print job on a second window, the print job comprising a digital image to be printed on an image receiving medium by means of a digital printer having a user interface comprising a first window representing a waiting room for the print job which is selectable to be printed, and the second window for displaying a virtual representation of the image receiving medium.

BACKGROUND OF THE INVENTION

Screen-based graphic user interfaces are frequently used for operating electronically controlled apparatus or systems such as, for example, a document processing system or a digital printing system. Depending upon the complexity of the system, the user interface may be utilized by an operator of a digital printer. The digital printer may be able to combine print jobs to be printed on a single media entity such as a roll or a rigid. Configuration options are provided to select a preferred way the printer will do a position proposal, for example from left to right, or from top to bottom.

In an image editing or paint program, the canvas is a window in which a picture or an image is dropped, copied, created and/or edited. It is the on-screen counterpart of the cloth canvas used by an artist. Instead of a canvas, the term canvas item may be used hereinafter.

The term corner indication may also be called corner indicator hereinafter. A corner is defined as a place where lines or sides join together to form an angle, or a remote or secluded place. An example of a corner is where two perpendicular lines on a virtual representation of an image receiving medium come together. An example of a corner indication are two perpendicular crossing lines that are parallel to a width and a length of the image receiving medium respectively.

SUMMARY OF THE INVENTION

It is an object of the invention to provide a method by which a clear indication on the virtual representation of the image receiving medium is provided where the digital image of the print job will be positioned.

In order to achieve that object, the method according to the invention comprises the steps of:
  displaying a corner indication on the second window, the corner indication indicating a location where a top left corner of the digital image of the print job will be placed on the image receiving medium,
  selecting the print job in the first window,
  upon selection of the print job in the first window, replacing the corner indication by a canvas item with a size of a layout of the digital image of the selected print job,
  moving or copying the selected print job from the first window to the second window,
  upon moving or copying the selected print job from the first window to the second window, replacing the canvas item by a preview image of the digital image of the selected print job of the same size as the layout, and
  moving the corner indication to a location on the virtual representation where a next to be selected print job will originate.

The invention is based on the consideration that an operator who is particularly interested in nesting images on a roll or rigid wants to know in advance how the images will be positioned on the image receiving medium. The separate showing of the canvas item and the preview image in the second window in two separate steps of the method according to the present invention is advantageous. The main advantage is namely that the selection of a print job in the waiting room results in showing the canvas item on the second window and does not yet result in a concrete action of the printing system like moving the image(s) of the print job to the print queue for actually printing the image(s) on the image receiving medium. This way of selecting the print job leaves room for other actions than a move or a copy from the waiting room to the second window, such as a delete action or a reset action.

The print job is actually moved or copied from the waiting room to the second window by a move or copy action respectively which is different from the selection action. By showing an outline at the selection action, and showing a preview image later after the move or copy action, said difference is emphasized and increased. The shown outline of the canvas item helps the operator beforehand to decide whether or not to move or copy the print job from the waiting room to the first window.

Another advantage of the method is that the selection step is fast in time since not a preview of the image is initially displayed but only an outline of the image is displayed. Moreover, a selection of multiple images to be printed works relatively fast for the operator or user.

According to an embodiment the step of moving the corner indication to a location on the virtual representation, occurs upon selection of the print job in the first window.

According to an alternative embodiment the step of moving the corner indication to a location on the virtual representation, occurs upon moving or copying the selected print job from the first window to the second window.

According to an embodiment the method comprises the step of subsequently selecting a plurality of print jobs, and, upon replacing the corner indication by the canvas item, giving feedback on issues originating from different print modes of the plurality of selected print jobs or a misfit of any of digital images of the plurality of print jobs on the virtual representation of the image receiving medium.

The present invention gives upfront information to the operator what a targeted action will result in. The present invention is a means to already provide extra information to the operator on the result, e.g. the exact image size on the image receiving medium and possible conflicts.

The invention also relates to a user interface for a digital printer for printing a print job comprising a digital image to be printed on an image receiving medium, the user interface comprising a first window representing a waiting room for the print job which is selectable to be printed, and a second window for displaying a digital representation of the image receiving medium, wherein the user interface is configured to select and display the print job according to the steps of the method of the present invention. The user interface comprises both the first and the second window, i.e. on a same screen.

The invention also relates to a digital printer for printing print jobs comprising a digital image to be printed on an image receiving medium, wherein the digital printer comprises a user interface according to the present invention.

The invention also relates to a software product comprising program code on a machine-readable medium, which program code, when loaded into a print controller of a digital printer, causes the print controller to control a user interface of the digital printer in accordance with a method of the present invention.

BRIEF DESCRIPTION OF THE DRAWINGS

Embodiment examples will now be described in conjunction with the drawings, wherein.

DETAILED DESCRIPTION OF THE INVENTION

Figure 1:
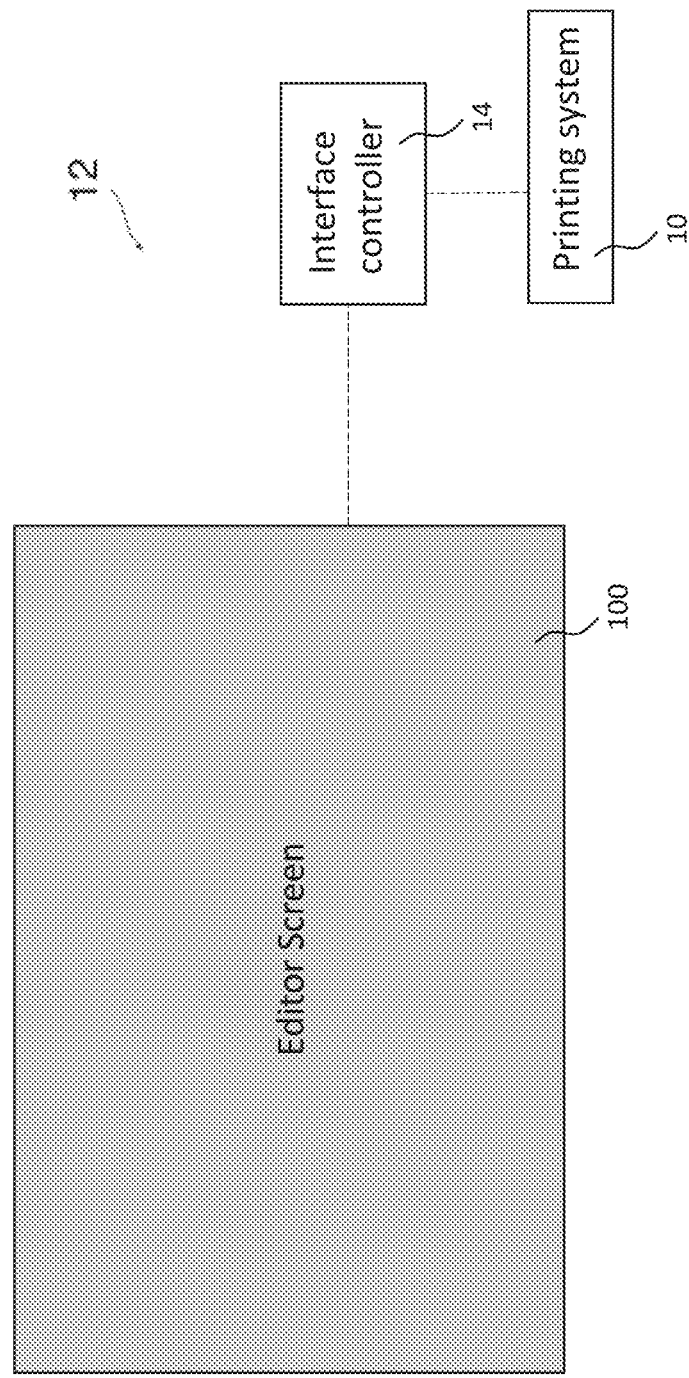
FIG. 1 is a block diagram of a printing system according to the present invention.

FIG. 1 is a block diagram in which a system to be controlled, the system being a printing system 10 in this example, has been represented by a single block. An associated user interface 12 comprises an interface controller 14, also represented by a single block, and an editor screen 100 which has been shown in greater detail in FIGS. 2-6. The editor screen 100 serves as a graphical output device of the user interface 12 but may also be configured as a touch-sensitive screen, so that it can serve as an input/output device for entering commands and for displaying messages to be output to a user. In another embodiment, a separate input device may be provided, e.g. in the form of a keyboard and a mouse.

The editor screen 100 is controlled by the interface controller 14 which is configured for wireless or wired communication with electronic controllers of various components of the printing system 10.

It will be noted that the user interface 12 may for example be formed by a wireless mobile device such a smartphone with a suitable software application loaded therein and configured for wireless communication with the printing system 10.

Figure 2:
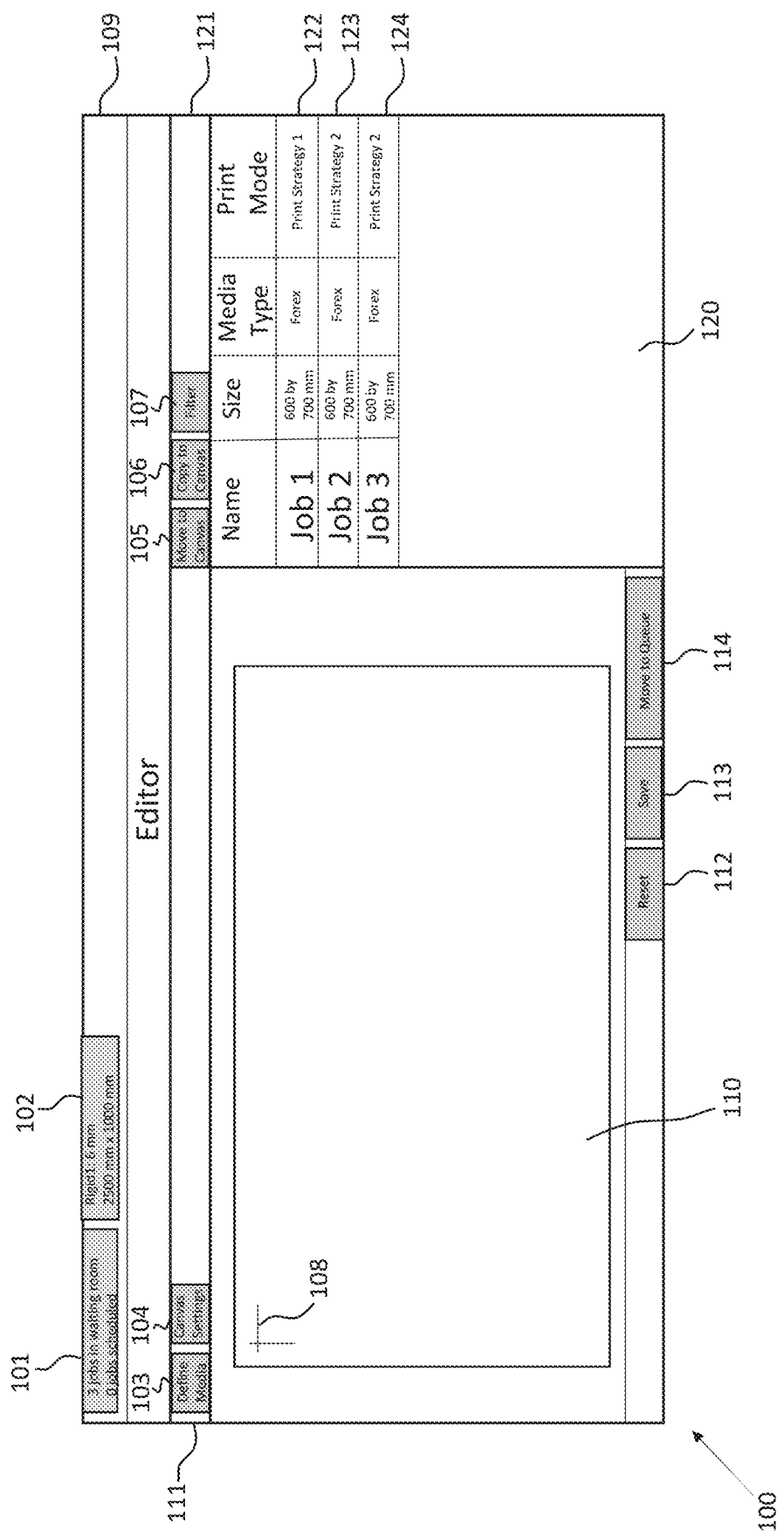
FIGS. 2-6 are user interface screens according to the present invention.

In the example shown in FIG. 2, the display area of the editor screen 100 is divided into a control bar 109 at the top margin and a number of windows 110, 120. The display area of the editor screen 100 is reserved for displaying various display items 111, 103, 104, 108, 121, 105, 106, 107, 122, 123, 124, 112, 113, 114. The control bar 109 at the top margin comprises a first tile 101 for showing the number of jobs in the waiting room and the number of jobs in the print queue, and a second tile 102 for showing the kind of image receiving medium which is currently being used by the printer. In a sub-control bar 111 a first button 103 is configured to define the image receiving medium and a second button 104 is configured to control the canvas settings for the second window 110. The first window 120 represents a waiting room for print jobs 122, 123, 124. The print jobs are provided with print job settings like size, for example 600×700 mm, a media type, for example "Forex", and a print mode, for example "Print Strategy 1" and "Print Strategy 2". A sub-control bar 121 of the window 120 comprises a first button 105 for moving a selected print job to the second window 110, a second button 106 for copying a print job to the second window 110 and a third button 107 for filtering the number of jobs by means of a filter criterion (not shown). In the bottom margin three buttons 112-114 are provided. A first button 112 is configured to reset the second window 110 to its original configuration. A second button 113 is configured to save the configuration as it is displayed at the second window 110. A third button 114 is configured to move the canvas configuration established in the second window 110 to a print queue of the printing system 10.

The second window 110 is a virtual area comprising a representation of the image receiving medium to be printed upon. The second window 110 initially comprises a corner indicator 108 for indicating in which corner of the image receiving medium the first image to be printed will be positioned. In the example of FIG. 2 the top left corner is indicated by the corner indication 108. The corner indicator 108 is visible on the editor screen 100 without any print job being selected.

By means of the second window 110 the operator is able to combine print jobs on a single media-entity such as a roll or a rigid. Configuration options may be present to select a preferred way the user interface will do the position proposal, e.g. from left to right, or from top to bottom.

Figure 3:
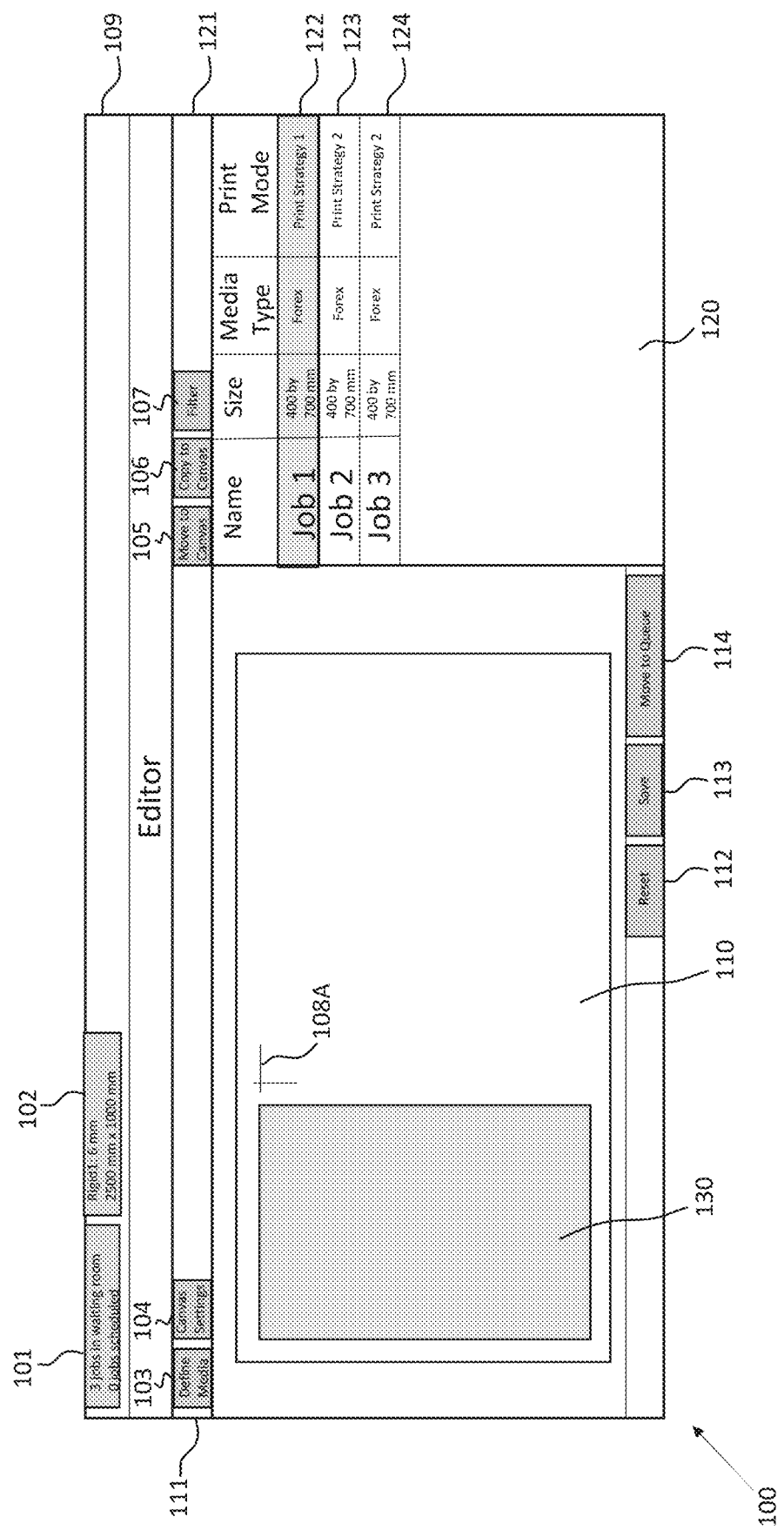

FIG. 3 shows a next action of the operator, namely a selection of a print job from the waiting room 120. In FIG. 3 the print job 122 labeled "Job 1" is selected as indicated by a grey colour of a row of print job 122. When the print job 122 is selected, immediately a clear indication is given on the virtual image receiving medium in the second window 110, where the selected image will be positioned on the image receiving medium. The clear indication is a canvas item. The canvas item may be in a form of a rectangle 130 representing the print job 122 conform its size of 400 by 700 mm.

The corner indicator 108 on the second window 110 is replaced by the canvas item 130 which has an outline with a size of a layout of the digital image of the selected print job 122.

At the same time the corner indicator 108 is moved to a location 108A on the second window 110 where a next to be selected print job will originate.

It is concluded that when a print job is selected in the waiting room 120 the user interface system immediately gives a layout indication of where the image of the print job will be located on the image receiving medium even before actually moving or copying the print job to the second window 110.

Figure 4:
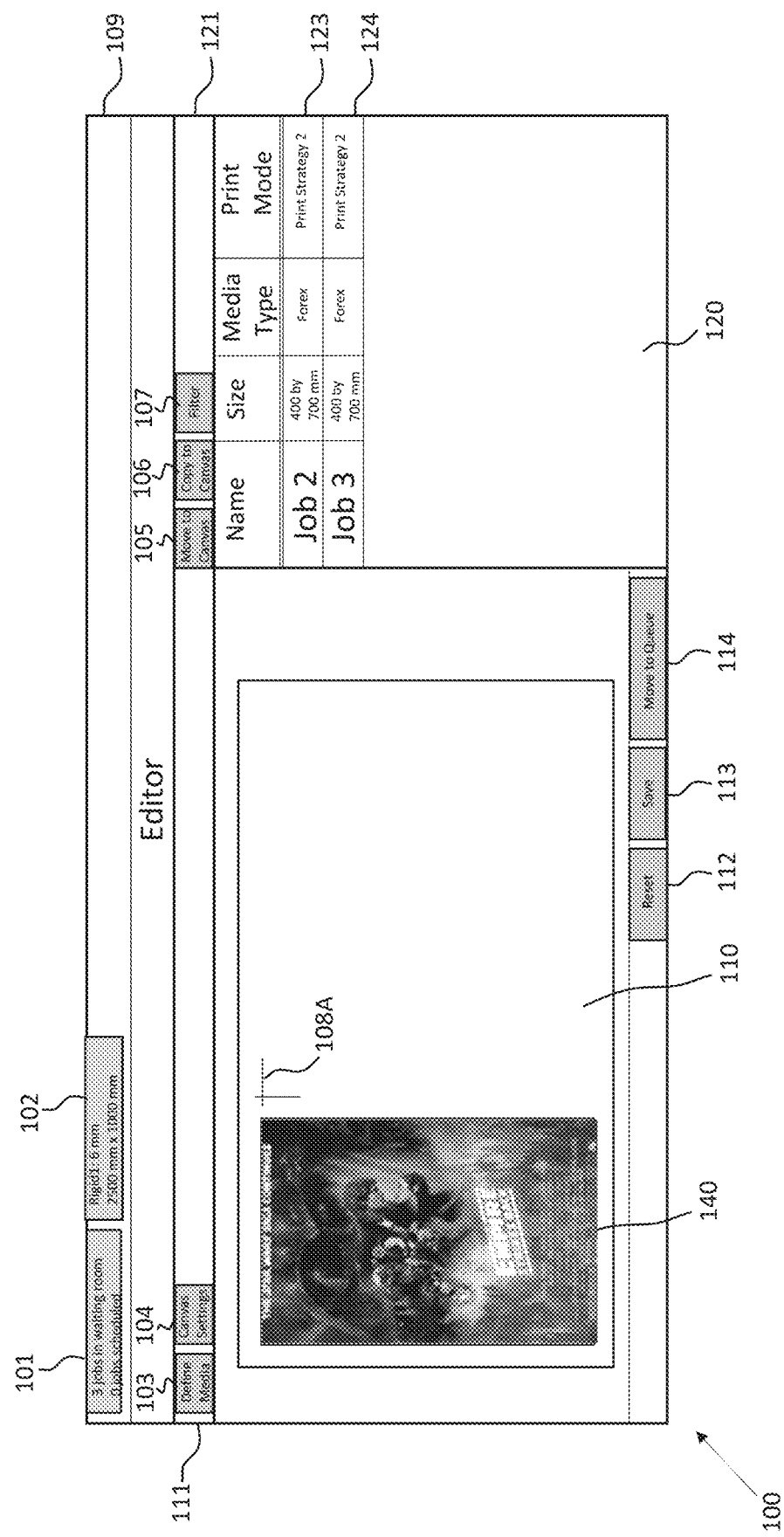

FIG. 4 shows a next action of the operator, namely a move or copy action of a print job from the waiting room 120 to the second window 110. In FIG. 3 the print job 122 labeled "Job 1" is selected as indicated by the grey colour of the row of print job 122. The operator may press the first button 105 in the sub-control bar 121 in order to move the selected print job 122 to the virtual representation of the image receiving medium in the second window 110. At the same time the canvas item 130 is immediately replaced by a preview image 140 of the digital image of the selected print job 122. In a touch screen variant the operator may drag the print job into the area of the second window 110. As soon as the drag action is completed the canvas item 130 is replaced by the preview image 140.

The size of the preview image 140 is of the same size as the canvas item 130. The picture of the preview image 140 shows the result of the visualization when the print job is actually moved or copied to the second window 110 representing the image receiving medium.

In case of a move action by means of the button 105 or a drag action the job entry 122 of "Job 1" will disappear from the list of print jobs in the waiting room 120 such that only the remaining print jobs 123, 124 are still visible as shown in FIG. 4.

In case of a copy action by means of the button 106 the job entry 122 of "Job 1" will stay in the list of print jobs in the waiting room 120.

Figure 5:
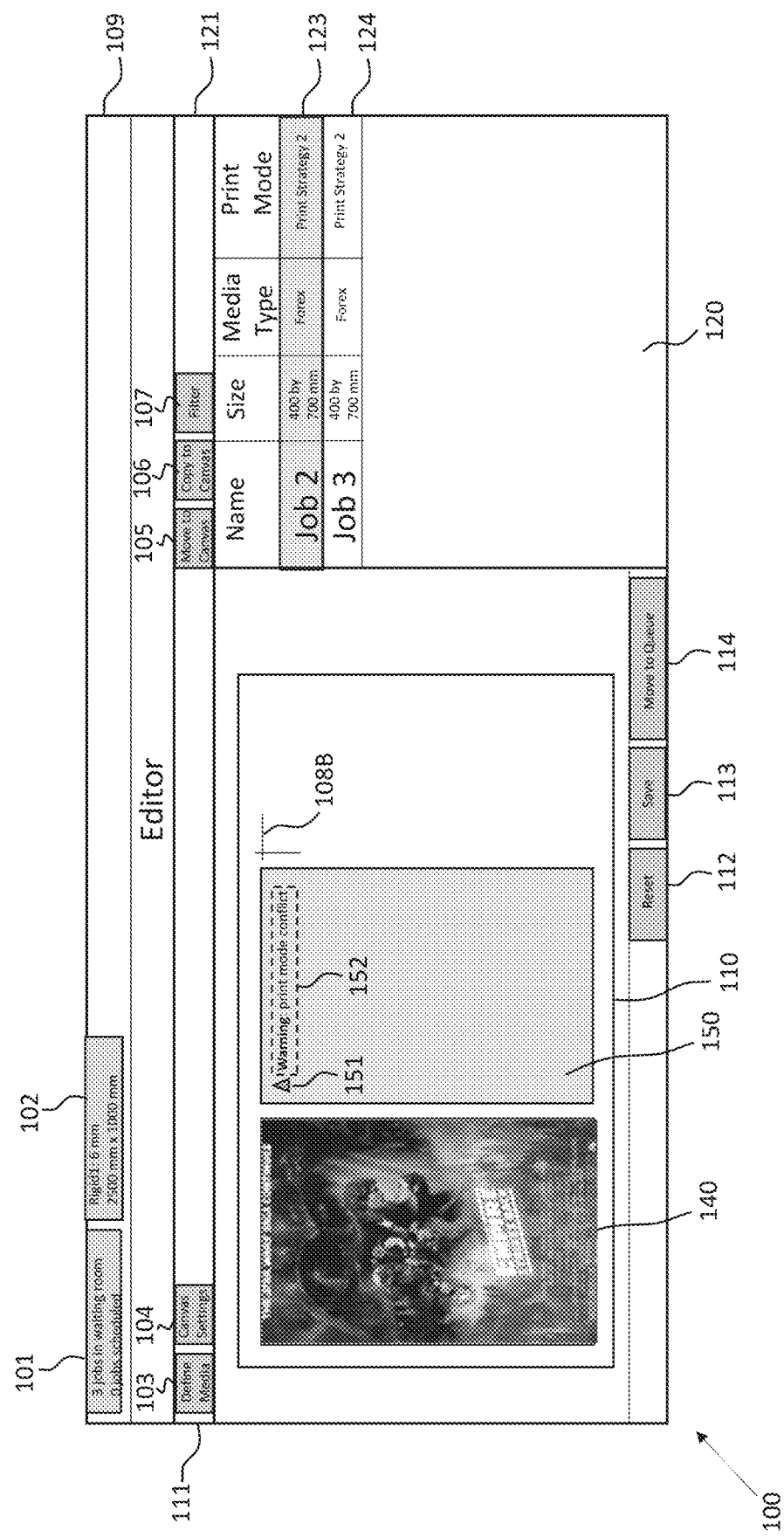

FIG. 5 shows a next action of the operator, namely a selection of a next print job from the waiting room 120. In FIG. 5 the print job 123 labeled "Job 2" is selected as indicated by a grey colour of a row of print job 123. When the print job 123 is selected, immediately a clear indication is given on the virtual media in the second window 110, where the selected image will be positioned on the image receiving medium. The clear indication may be a canvas item in a form of a grey rectangle 150 representing the print job 123 conform its size 400 by 700 mm.

The corner indicator 108A on the second window 110 in FIG. 4 is replaced in FIG. 5 by the canvas item 150 which has an outline with a size of a layout of the digital image of the selected print job 123.

At the same time the corner indicator 108A as shown in FIG. 4 is moved to a location 108B on second window 110 where a next to be selected print job will originate.

The print mode setting of the firstly selected print job 122 and the secondly selected print job 123 are different as indicated in the print job list shown in the first window 120. As already shown in FIG. 2 the print mode of the firstly selected print job 122 is according to a print strategy named "Print Strategy 1", while the print mode of the secondly selected print job 123 is according to a print strategy named "Print Strategy 2". The fact that the images of the print job 122 and the print job 123 are intended to be printed aside of each other on the image receiving medium as indicated by the virtual representation of the image receiving medium on the second window 110, will generate a conflict situation. Therefore a warning indicator 151 and a warning text 152 will be displayed in the gray rectangle 150 in order to warn the operator and let him solve this issue.

It is concluded that when a print job is selected in the waiting room 120 the user interface system immediately gives a layout indication of where the image of the print job will be located on the image receiving medium even before actually moving or copying the print job to the second window 110. In case of a conflict, the operator is warned by a message in the appropriate area of the second window 110. The message contains feedback on issues like mismatching print modes and images that do not fit on the image receiving medium.

Figure 6:
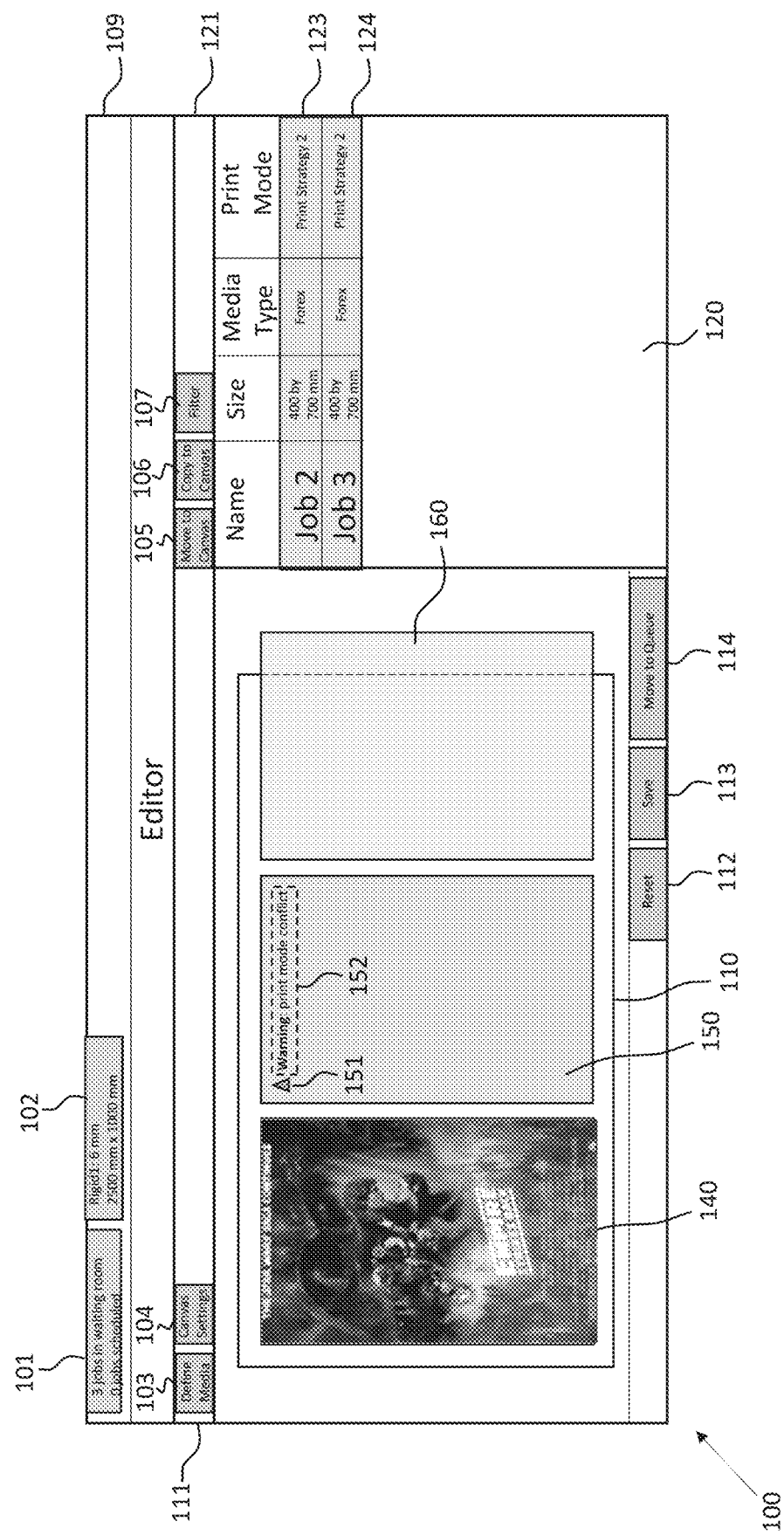

FIG. 6 shows an example of a situation wherein the operator also selects the print job 124 labeled "Job 3". In FIG. 6 the print job 124 labeled "Job 3" is also selected as indicated by the grey colour of the row of print job 124. When the print job 124 is selected, immediately a clear indication is given on the virtual image receiving medium in the second window 110, where the selected image will be positioned on the image receiving medium. The clear indication may be a canvas item in a form of a grey rectangle 160 representing the print job 124 conform its size 400 by 700 mm.

The corner indicator 108B (see FIG. 5) on the second window 110 is replaced by the canvas item 160 which has an outline with a size of a layout of the digital image of the selected print job 124.

The corner indicator 108B as shown in FIG. 5 is not moved to a location on the second window 110 where a next to be selected print job will originate, since the image receiving medium has been fully occupied by the images resulting from selecting the plurality of print jobs 122, 123, 124. Instead of a move of the corner indication 108B, the corner indication 108B is disappeared.

Moreover, the image of the print job 124 does not completely fit on the virtual image receiving medium, i.e. the image of the print job 124 will not fit on the image receiving medium when printed. Therefore the canvas item 160 which protrudes from the second window 110 is marked, for example by means of a deviating colour of the interior of the rectangle of canvas item 160 and/or another warning message (not shown) at the canvas item 160.

In the shown examples in FIGS. 2-6 the sizes of the images of the print jobs 122, 123, 124 are the same. However, while nesting print jobs on the editor screen 100 as shown in FIGS. 2-6, images of different sizes may be envisioned.

In FIGS. 2-6 one print job has been selected at a time. However, according to an embodiment of the invention multiple print jobs are selected simultaneously by a multi-select option configured for the window 120 of the waiting room of the print jobs. and for each selected print job a canvas item will be shown at selection, and also feedback on issues like mismatching print modes and images that do not fit on the image receiving medium. The feedback is given at selection of a print job or a plurality of print jobs before actually moving or copying the print job(s) to the second window 110.

Figure 7:
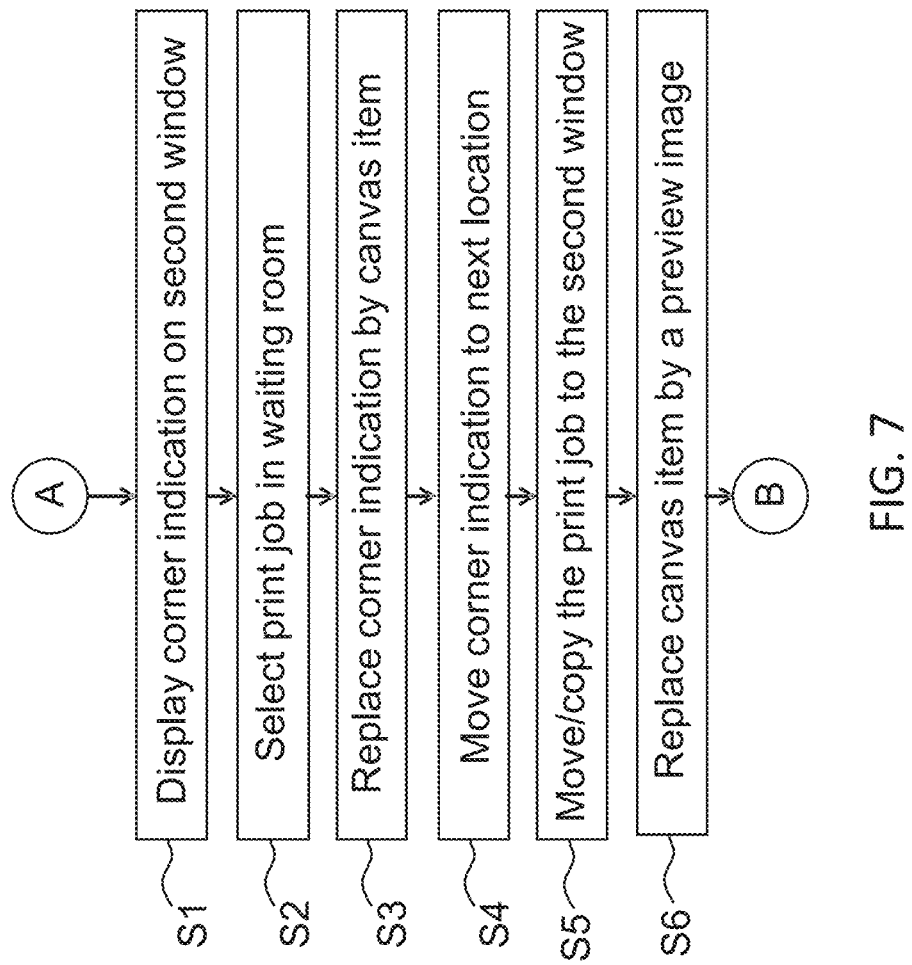
FIG. 7 is a flow diagram of the method according to the present invention.

FIG. 7 shows a schematic flow diagram illustrating a method according to the invention. The method is suitable for controlling a user interface of a printing system for printing images on an image receiving medium. The printing system comprises a print engine and a print controller for managing the printing of digital images on the image receiving medium like a roll or rigid. The method starts in a starting point A and leads to a first step S1.

In the first step S1 a corner indication 108 is displayed on the second window 110. The corner indication 108 indicates a location where a top left corner of the digital image of the print job 122 will be placed on the image receiving medium.

In a second step S2 the print job 122 is selected in the first window 120 representing the waiting room.

In a third step S3, upon selection of the print job 122 in the first window 120, the corner indication 108 is replaced by a canvas item 130 with a size of a layout of the digital image of the selected print job 122.

In a fourth step S4, upon selection of the print job 122 in the first window 120, the corner indication 108 is moved to a location 108A on the virtual representation where a next to be selected print job will originate.

In a fifth step S5 the selected print job 122 is moved or copied from the first window 120 to the second window 110 being a virtual representation of the image receiving medium.

In a sixth step S6, upon moving or copying the selected print job 122 from the first window 120 to the second window 110, the canvas item 130 is replaced by a preview image 140 of the digital image of the selected print job 122 of the same size as the layout.

The method ends in an endpoint B.

According to an alternative embodiment the fourth step S4 is left out of the method as described here-above, and a seventh step is added to the method after the sixth step S6. In the seventh step, upon moving or copying the selected print job 122 from the first window 120 to the second window 110 in the fifth step S5, the corner indication 108 is moved to a location 108A on the virtual representation where a next to be selected print job will originate. In this embodiment the sixth step S6 and the seventh step are interchangeable with respect to its execution order.

Figure 8:
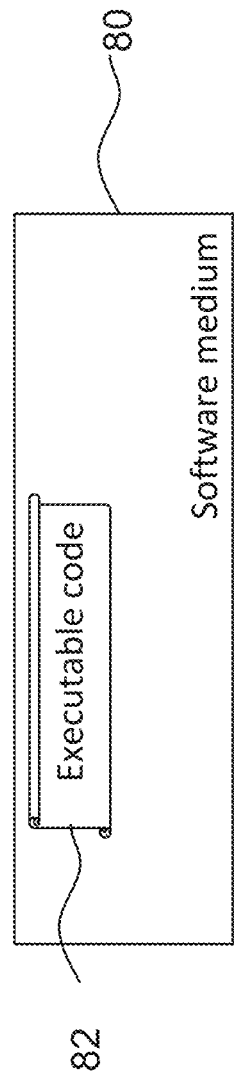
FIG. 8 is a diagram of a software product according to the present invention.

FIG. 8 schematically shows a non-transitory software medium 80 according to the invention. The software medium 80 comprises executable code 82 configured to, when executed, perform the method according to the invention, e.g. as described with respect to either the printing system 10 shown in FIG. 1 or the method of controlling the user interface of the printing system 10 according to any or all of the FIGS. 2 to 6 and/or according to any of the variants and modifications of the printing system 10 and/or of the method described herein.

The non-transitory software medium 80 may, specifically, be formed as a CD or a CD-ROM, a DVD or a DVD-ROM, a BluRay disc or a BluRay-ROM disc, a magnetic hard drive, a solid state disk (SSD) hard drive, a USB memory device and so on.

While detailed embodiments of the present invention are disclosed herein, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In particular, features presented and described in separate dependent claims may be applied in combination and any advantageous combination of such claims are herewith disclosed.

Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language).

The invention claimed is:

1. A method for selecting a print job and displaying the print job on a second window, the print job comprising a digital image to be printed on an image receiving medium by a digital printer having a user interface comprising a first window representing a waiting room for the print job which is selectable to be printed, and the second window for displaying a virtual representation of the image receiving medium, the method comprising the steps of:

displaying a corner indication on the second window, the corner indication indicating a location where a top left corner of the digital image of the print job will be placed on the image receiving medium;

selecting the print job in the first window;

upon selection of the print job in the first window, replacing the corner indication by a canvas item with a size of a layout of the digital image of the selected print job;

moving or copying the selected print job from the first window to the second window;

upon moving or copying the selected print job from the first window to the second window, replacing the canvas item by a preview image of the digital image of the selected print job of the same size as the layout; and moving the corner indication to a location on the virtual representation where a next to be selected print job will originate.

2. The method according to claim 1, wherein the step of moving the corner indication to a location on the virtual representation, occurs upon selection of the print job in the first window.

3. The method according to claim 1, wherein the step of moving the corner indication to a location on the virtual representation, occurs upon moving or copying the selected print job from the first window to the second window.

4. The method according to claim 1, further comprising the step of subsequently selecting a plurality of print jobs, and, upon replacing the corner indication by the canvas item, giving feedback on issues originating from different print modes of the plurality of selected print jobs or a misfit of any of digital images of the plurality of print jobs on the canvas.

5. A user interface for a digital printer for printing a print job comprising a digital image to be printed on an image receiving medium, the user interface comprising:

a first window representing a waiting room for the print job which is selectable to be printed; and a second window for displaying a digital representation of the image receiving medium, wherein the user interface is configured to select and display the print job according to the steps of the method of claim 1.

6. A digital printer for printing print jobs comprising a digital image to be printed on an image receiving medium, the digital printer comprising the user interface according to claim 5.

7. A software product comprising program code on a non-transitory machine-readable medium, the program code, when loaded into a print controller of a digital printer, causing the print controller to control a user interface of the digital printer in accordance with the method according to claim 1.

* * * * *